Patented Dec. 11, 1951

2,578,168

UNITED STATES PATENT OFFICE 2,578,168

RESINOUS COPOLYMERIZATION PRODUCTS

Herman S. Bloch, Chicago, Ill., assignor to Universal Oil Products Company, Chicago, Ill., a corporation of Delaware No Drawing. Application November 16, 1948, Serial No. 60,380

9 Claims. (Cl. 260—78.5)

This application is a continuation-in-part of my copending applications Serial Numbers 574,823 and 574,826 filed January 26, 1945, now abandoned.

This invention relates to new resinous intermediates and resinous materials produced therefrom as well as to methods for their preparation.

More particularly, the invention is directed to new compositions which comprise the reaction product of a polymerizable unsymmetrical ethylenic compound containing at least one strongly electro-negative group and the adduct of a dicarboxylic dienophilic acid ester of a beta, gamma olefinic alcohol and a polyolefinic cyclic hydrocarbon fraction.

An object of this invention is to provide a new class of resinous compounds suitable for use in coating compositions, molding plastics, adhesives and the like.

A further object of this invention is to provide a method for the manufacture of novel resinous materials which range from semi-solid products to hard clear resins.

In one embodiment this invention relates to a resinous material comprising the copolymerization product of (1) an ethylenic compound with (2) the adduct of a dicarboxylic dienophilic acid ester of a beta, gamma-olefinic alcohol and a polyolefinic cyclic hydrocarbon fraction containing an average number of double bonds per molecule of from about 2.5 to about 4 of which from about 40 to about 70% are conjugated, said fraction being the organic decomposition product of the catalyst complex resulting from the catalytic conjunct polymerization of an olefin-acting compound, said polyolefinic cyclic hydrocarbon fraction having a boiling range of between about 150° and about 450° C., a bromine number of above about 140, a density of about 0.83 to 0.93, an acid number below 3, a maleic anhydride value of from about 30 to about 90, and said ethylenic compound containing at least one strongly electro-negative group attached to a carbon atom selected from the members of the group consisting of an ethylenic carbon atom and a carbon atom in the alpha position to an ethylenic carbon atom.

Broadly my invention is directed to the preparation of resinous materials which comprise copolymers of an adduct of a dicarboxylic dienophilic acid ester of a beta, gamma-olefinic alcohol and a cyclic polyolefinic hydrocarbon fraction. Adducts of diallyl maleate or diallyl fumarate and a cyclic polyolefin with conjugated unsaturation are particularly utilizable in this process.

Although investigators differ as to the exact order of relative electronegativity of different substances and groups, they are in general agreement as to which groups are strongly electronegative and which are more weakly electronegative in character. The strongly electronegative substituents, when attached to one of the carbon atoms of an ethylenic group tend to increase the activity of the ethylenic group to which they are attached. When the strongly electronegative substituent is attached to a carbon atom which is in alpha position to the ethylenic group, the activity of the group is likewise increased but to a lesser extent than is true when the electronegative substituent is attached directly to an ethylenic carbon atom. The reactivity of materials containing the strongly electronegative substituent attached to the alpha carbon atom, however, is greater than that of those ethylenic compounds which have no electronegative group at all. For example, allyl esters are less reactive than vinyl esters, but more reactive than propylene in polymerization reactions. The introduction of chlorine on a carbon atom in alpha position to the ethylenic group serves to increase the reactivity of the resulting compound so that it undergoes polymerization much more easily than the corresponding hydrocarbon. Similarly, the substitution of the strongly electronegative phenyl group for a hydrogen atom on the alpha carbon atom tends to activate the ethylenic double bond. A similar effect may be observed with other strongly electronegative elements such as those selected from groups V, VI and VII of the periodic table and particularly those having an atomic number less than 18, namely, nitrogen, oxygen, fluorine, phosphorus, sulfur, and chlorine; or with other strongly electronegative organic radicals, for example, aromatic hydrocarbon radicals and substituted aromatic radicals. Asymmetry in the substituted ethylene compound appears to be an important requisite, while the presence of a terminal methylene group as one of the constituents of the ethylenic compound likewise appears to facilitate polymerization. These principles have been utilized in the preparation of the resins of my invention wherein a substituted cyclic diene is reacted with an ethylenic compound containing an electronegative group which is directly attached to an ethylenic carbon atom or to a carbon atom in alpha position to an ethylenic carbon atom.

When hydrocarbons are reacted in the presence of a catalyst such as, for example, anhydrous hydrogen fluoride, concentrated sulfuric acid, or anhydrous aluminum chloride, which promotes conjunct polymerization reactions, under carefully controlled conditions of reaction, the used catalyst phase can be made to contain certain valuable materials including a major proportion of cyclic polyolefinic hydrocarbons having a high degree of conjugated unsaturation. This material which can be recovered from the catalyst phase is referred to in this specification as a polyolefinic cyclic hydrocarbon fraction containing an average of from about 2.5 to about 4 double bonds per molecule, with from about 40 to about 70% of said double bonds being conjugated.

The complex series of reactions herein referred to in the aggregate as a "conjunct polymerization reaction" comprises an initial polymerization and condensation reaction between the olefinic hydrocarbons or other olefin-acting starting material followed by cyclization and isomerization of polymers and condensation products, accompanied by a hydrogen transfer reaction between the organic compounds or conjunct polymers present in the reaction mixture whereby a portion of said polymers is converted into saturated hydrocarbons by virtue of the hydrogen transfer at the expense of other components which are converted into highly unsaturated organic compounds containing on an average of from about 2.5 to about 4 double bonds per molecule of which from about 40 to about 70% are conjugated. The resulting unsaturated conjunct polymers, comprising a series of high molecular weight polyolefinic cyclic compounds, become attached by weak chemical bonds to the catalyst to form a sludge-like complex addition product in which fluorine (in the case of a hydrogen fluoride catalyst) is not, however, organically bound, since it can be substantially all removed by treatment of the complex with water or cold aqueous alkali. The saturated hydrocarbon conjunct polymers form an insoluble phase which upon standing of the reaction mixture separates as a distinct upper layer as hereinabove referred to. Since the formation of unsaturated conjunct polymers is dependent upon the presence of hydrogen acceptors in the reaction mixture, it also follows that the proportion of hydrogen acceptors to hydrogen donors influences the total unsaturation of the polyolefinic conjunct polymers formed as well as their yield from given weights of olefin-acting compounds or olefinic hydrocarbon starting materials.

The olefin-acting compounds used as starting materials in this process comprise normally gaseous and normally liquid monoolefinic hydrocarbons, certain polyolefinic hydrocarbons such as butadiene, divinylbenzene, certain highly branched and readily cracked paraffins which easily yield olefins on cracking, and the like.

For authoritative use of the term "conjunct polymerization," reference is made to the following publications: Ipatieff, "Catalytic Reactions at High Pressures and Temperatures" (MacMillan Company, New York, 1936) page 612. Berkman, Morrell and Egloff, "Catalysis" (Reinhold Publishing Company, 1940), page 606. Ipatieff and Pines, J. Org. Chem. 1, 465 (1936). Ipatieff et al., J. Am. Chem. Soc., 58, 917 (1936).

Study of the ultra-violet and infra-red absorption spectra and other properties of hydrocarbon materials recovered from hydrogen fluoride sludges that have been used in promoting hydrocarbon conversion reactions such as olefin polymerization, alkylation and the like, shows that most of the resultant hydrocarbon condensation products contain a pair of conjugated double bonds with one of these double bonds in a ring of five carbon atoms and the other double bond in an alkenyl side chain. Thus a cyclopentene ring may be combined with a methylene group or a vinyl group. In the case of the polyolefinic cyclic hydrocarbons recovered from hydrogen fluoride sludges, the cyclopentadiene ring structure, if present at all, is present in only a minor portion of the material. Although the lower-boiling hydrocarbons are monocyclic, the less volatile fractions contain an average of two or more rings per mol; and even these rings appear to be largely five-membered rather than of the hydroaromatic type. As a class, the hydrocarbons comprising the unsaturated conjunct polymers may be designated generally as polyolefinic cyclopentenyl hydrocarbons or more specifically as alkenylcyclopentenes.

In both the monocyclic and polycyclic hydrocarbon product formed by conjunct polymerization of a monoolefinic hydrocarbon, the 5-carbon atom ring portion of the molecule is combined with at least two alkyl groups or with two unsaturated aliphatic groups. Some of the typical alkenylcyclopentenyl hydrocarbons contained in such conjunct polymerization products formed from polymer gasoline are represented structurally by the following formula:

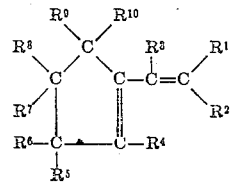

wherein the radicals $R^1$ to $R^{10}$ are selected from the group consisting of hydrogen and alkyl, alkenyl, and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the polyolefinic cyclic hydrocarbon fraction formed from polymer gasoline are believed to have alkenylcyclopentene structures which may be represented by the formula:

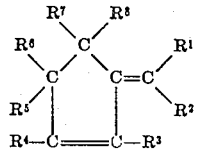

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The polyolefinic cyclic hydrocarbon fraction used as one of the essential starting materials in my process may be formed in the following manner:

An olefinic hydrocarbon or other olefin-acting compound is contacted with a conjunct polymerization catalyst as concentrated hydrofluoric acid and at conjunct polymerization conditions, the resultant upper saturated hydrocarbon layer is separated from the lower sludge layer, the sludge is decomposed by water hydrolysis, by controlled heating methods or by other suitable means, and the polyolefinic cyclic hydrocarbon fraction is recovered.

In forming the polyolefinic cyclic hydrocarbon fraction, the weight ratio of the hydrogen fluoride catalyst to the olefinic charging stock, that is, to the olefinic hydrocarbon or other olefin-acting compound, will vary from about 0.1 to 10. When the hydrogen fluoride to organic compound weight ratio is less than about 0.1, it is necessary to recycle excessive amounts of organic compounds in order to obtain good conversion, while increase in this ratio above about 10 causes very little further increase in yield of the desired reaction product but such increased ratio of hydrogen fluoride to total organic reactants does decrease the capacity of the reactor or other treating equipment.

The step of the present process used for producing the polyolefinic cyclic hydrocarbon fraction is carried out at a temperature of from about +10° to about 150° C. and at a pressure sufficient to maintain the reactants and catalysts in substantially liquid phase. The operating pressure is generally from about 1 to about 100 atmospheres. At these reaction conditions, a vigorously agitated mixture of hydrogen fluoride and olefinic hydrocarbon yields a high proportion of catalyst layer containing polyolefinic cyclic hydrocarbons during a time of from about 1 to about 30 minutes, but the reaction may be continued for a longer time to obtain an increased yield of the unsaturated cyclic hydrocarbon fraction.

Normally gaseous and normally liquid olefinic hydrocarbons are utilizable as charging stocks in the production of the aforementioned polyolefinic cyclic hydrocarbon fractions. The olefinic hydrocarbons preferred as charging stocks for this process have from about 4 to about 12 or more carbon atoms per molecule. Besides olefinic hydrocarbons, other olefin-acting compounds, such as alkanols, alkyl ethers, alkyl esters, alkyl halides, alkyl mercaptans, and the like may be employed following essentially the same procedure as applied to olefinic hydrocarbon charging stocks. These, olefin-acting compounds may undergo conversion into olefins as transitory intermediate products, during the reaction in the presence of a conjunct polymerization catalyst. It is of interest to note that in the type of polymerization observed in this process, in which hydrogen transfer occurs, the organic product recovered from the sludge or catalyst layer has a higher molecular weight than the charging stock and is generally more unsaturated than the charging stock.

In carrying out the production of the polyolefinic cyclic hydrocarbon fraction used as a starting material in this process, an olefinic hydrocarbon and liquid hydrogen fluoride (as an example of a conjunct polymerization catalyst) generally of from about 90 to about 100% HF concentration, are added to a suitable reactor provided with adequate means of agitating the reactor contents and of controlling the temperature therein. Since the condensation, polymerization, and copolymerization reactions of this process are exothermic, it is generally necessary to cool the reactor in order to maintain the chosen reaction temperature. The olefinic hydrocarbon and/or other olefin-acting compound and hydrogen fluoride catalyst are generally mixed at such rates that substantially all of the organic compounds charged are converted into the saturated, upper hydrocarbon layer and the higher-boiling, highly-unsaturated cyclic hydrocarbon material contained in the hydrofluoric acid catalyst layer. After the desired quantities of organic materials comprising olefinic hydrocarbons, other olefin-acting compounds, or mixtures of these organic materials have been added to the hydrofluoric acid, or after the hydrofluoric acid has been added to the organic material, the agitation or stirring of the reaction mixture is continued for a time sufficient to insure substantially complete conversion of the reactants into saturated hydrocarbons and also polyolefinic cyclic hydrocarbons. The agitation or mixing is then stopped and the reaction mixture is permitted to stand whereby it forms two layers, an upper substantially saturated hydrocarbon layer and a lower hydrogen fluoride layer. The substantially saturated hydrocarbon layer is separated from the lower hydrogen fluoride layer comprising essentially hydrogen fluoride and polyolefinic cyclic hydrocarbons.

As the saturated hydrocarbons of the upper layer boil over about the same range of temperature as do the constituents of the polyolefinic cyclic hydrocarbon fraction, and as small amounts of the saturated hydrocarbons are entrained or mixed with the hydrogen fluoride lower layer, it is advisable to extract the hydrogen fluoride lower layer with a low-boiling saturated hydrocarbon, preferably a paraffin having from 3 to about 8 carbon atoms per molecule before subjecting the hydrogen fluoride lower layer to hydrolysis or other treatment in order to recover the polyolefinic cyclic hydrocarbon fraction therefrom. From the lower layer, the used hydrogen fluoride and the polyolefinic cyclic hydrocarbon fraction are then separated by suitable means, for example, the lower layer may be added to water or ice whereby the hydrogen fluoride is dissolved in water to form an aqueous solution from which the polyolefinic cyclic hydrocarbon fraction separates as an upper layer. Also the hydrogen fluoride lower layer may be subjected to flash distillation to substantially vaporize the hydrogen fluoride from the higher-boiling, polyolefinic cyclic hydrocarbon fraction. When the lower layer is separated by distillation methods, the recovered hydrogen fluoride is suitable for recycling to the process to effect reaction of additional quantities of charged olefin-acting compound.

Passage of an inert gas, such as nitrogen, hydrogen, methane, ethane, carbon dioxide, and the like, through the distillation system in which the hydrogen fluoride is being separated from the polyolefinic cyclic hydrocarbons, assists in the recovery of said hydrocarbons. Separation of hydrogen fluoride from the cyclic hydrocarbon fraction in the lower layer is also assisted by carrying out the flash distillation of said lower layer in a tower containing catalytic packing material formed from graphitized carbon or from a metal selected from the members of the group consisting of aluminum, copper, cobalt, lead, cadmium, and an alloy of copper, such as brass and preferably in the presence of an inert gas to act as a carrier and thus assist in removing the liberated hydrogen fluoride.

Another method of decomposing the hydrogen fluoride sludge layer is to introduce this material into an inert liquid, such as a paraffinic hydrocarbon or naphtha, contained in a decomposition zone and maintained at an elevated temperature which is approximately the boiling point of the paraffinic naphtha. The decomposition zone or reactor tower may contain a catalytic packing material in the liquid zone of this reactor tower and a substantially inert gas may also be passed therethrough. The hydrogen fluoride so liberated is vaporized, condensed, and conducted to storage, while the inert liquid containing dissolved polyolefinic cyclic hydrocarbons is withdrawn from the decomposition zone, either intermittently or continuously, and replaced by fresh liquid. This liquid should be readily separable from the polyolefinic cyclic hydrocarbon fraction dissolved therein and it should also be relatively inert to the hydrogen fluoride sludge and to the products of the decomposition of the sludge. If a paraffinic naphtha is employed, its normal boiling point should be from about 100° to about 150° C. so that it may be separated by fractional distillation from the polyolefinic cyclic hydrocarbon fraction which boils generally from about 150° to about 450° C.

One method of carrying out the process of this invention is illustrated as follows:

A polymer gasoline boiling from about 50° to about 200° C. formed by polymerizing propylene and butylenes from a $C_3$-$C_4$ hydrocarbon fraction is contacted with an equal volume of hydrofluoric acid of 90 to 100% concentration in a mixing zone provided with suitable temperature control means and maintained at a temperature of about 60° C. The reaction mixture may also contain hydrofluoric acid previously used in the process and a low boiling saturated hydrocarbon as a butane fraction, the latter being separated from the final reaction products and recycled to the hydrogen fluoride containing reaction zone. The polymer gasoline feed stock and hydrogen fluoride catalyst are contacted in the mixing zone for a time of from about 1 to about 30 minutes which is generally sufficient to produce a substantially saturated hydrocarbon layer and a hydrogen fluoride catalyst layer containing polyolefinic cyclic hydrocarbons, the latter being associated with the liquid hydrogen fluoride in the form of a complex. From the mixing zone, the resultant reaction mixture is directed to a settling zone, wherein the mixture or emulsion of organic compounds and liquid hydrogen fluoride is permitted to stand and to separate into an upper substantially saturated hydrocarbon layer and a lower hydrofluoric acid catalyst layer. From the settling zone, the hydrofluoric acid catalyst layer containing polyolefinic cyclic hydrocarbons is withdrawn to a catalyst layer separating zone while a substantially saturated hydrocarbon material which separates as an upper layer in the settling zone is directed therefrom to a hydrocarbon layer separating zone. The hydrogen fluoride catalyst layer is then subjected to flash distillation to separate hydrogen fluoride from the polyolefinic cyclic hydrocarbon fraction. The used hydrogen fluoride so separated and recovered is directed at least in part through a recycle line to the original mixing zone while the polyolefinic cyclic hydrocarbon fraction is discharged from the separating zone to storage or to further purification or fractionation treatment. The upper hydrocarbon layer which was separated from the hydrogen fluoride catalyst layer in the settler is then subjected to suitable fractionation to separate as an overhead fraction a mixture of residual dissolved hydrogen fluoride and substantially low boiling hydrocarbons which were introduced to the process or formed during conversion reaction. If desired, a portion of the low boiling saturated hydrocarbons so recovered may be recycled to commingle with the polymer gasoline and hydrogen fluoride being contacted as aforementioned.

When the polymer gasoline or other olefinic or olefin-acting charging stock does not contain a substantial proportion of saturated hydrocarbons having from 3 to about 8 carbon atoms per molecule, it is advisable to extract the hydrofluoric acid layer with such a solvent before separating the polyolefinic cyclic hydrocarbon fraction from the hydrofluoric acid layer in order to obtain a polyolefinic cyclic hydrocarbon fraction substantially uncontaminated by saturated hydrocarbons of similar boiling range.

Concentrated hydrofluoric acid containing from 90 to 100% hydrogen fluoride is a preferred conjunct polymerization catalyst for use in this process, but other conjunct polymerization catalysts utilizable in the production of the polyolefinic cyclic hydrocarbon fraction include in general certain acid-acting halides such as aluminum bromide and aluminum chloride in their substantially anhydrous forms and used catalytic sludges containing these aluminum halides, also sulfuric acid of at least about 85% concentration, boron trifluoride, and mixtures of boron trifluoride with hydrogen fluoride. In the presence of these other catalysts, conjunct polymerization products are formed which are similar in many (but not all) respects in structure and physical properties to the conjunct polymers formed when hydrogen fluoride is utilized as the catalyst, but the process differs chiefly in the manner of recovering the conjunct polymers from sludges containing these catalysts. Because hydrogen fluoride sludges may be decomposed at such conditions that the catalyst may be recovered in substantially anhydrous condition suitable for recycling to the sludge-forming stage, it is generally preferred in the present process. When catalysts such as aluminum halide, hydrogen fluoride, or sulfuric acid are employed, the saturated hydrocarbon material produced during the conjuct polymerization reaction forms an upper layer while the highly unsaturated cyclic hydrocarbon fraction combines with the catalyst in a lower layer from which the polyolefinic cyclic hydrocarbon fraction employed in my process may be recovered.

The polyolefinic cyclic hydrocarbon fraction employed in preparing the composition of the present invention may be obtained in a number of different ways as aforementioned. For example, it may be derived from the catalyst phase formed in such processes as the alkylation of an isoparaffin with an olefin or other alkylating agent, the polymerization of normally gaseous or liquid olefins and the like. In order to prepare the polyolefinic cyclic hydrocarbon fraction having a high degree of conjugated unsaturation, a number of factors must be considered. The charging stock, as already stated, preferably comprises olefins, olefin-acting compounds, high boiling isoparaffins (such as high boiling alkylate), or a mixture of olefins and saturated substantially non-benzenoid hydrocarbons containing tertiary hydrogen atoms. As the temperature is increased and as the time is extended at which the catalyst complex is treated, the amount of conjugated unsaturation is decreased in the polyolefinic cyclic hydrocarbon fraction so recovered. To avoid this decrease or disappearance of unsaturation, the reaction conditions must be controlled carefully although the conditions at which a catalyst phase containing polyolefinic cyclic hydrocarbons is formed will vary over a relatively wide range. In this treatment, the reaction temperature is generally from about +10° to about 150° C. When employing hydrogen fluoride as a catalyst, reaction temperatures will vary from about +10° to about 150° C. When employing aluminum chloride catalysts, reaction temperatures of from about 25° to about 125° C. are preferred, while with sulfuric acid catalyst the temperature used is generally slightly lower than when using aluminum chloride catalyst because of the oxidizing effect of sulfuric acid at higher temperatures so that a range of about 25° to about 100° C. is preferable.

The polyolefinic cyclic hydrocarbon fraction formed as hereinabove set forth has a wide boiling range of from about 150° to about 450° C., a density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight) maleic anhydride values of about 30 to about 90 (usually in the range of about 45 to 75), acid number below 3, average number of olefinic double bonds per molecule varying between about 2.5 and about 4, of which from about 40 to about 70 per cent are conjugated, and excellent solubility in petroleum oils and vegetable oils such as linseed oil or tung oil. The polyolefinic cyclic hydrocarbon fraction has an average molecular weight of from about 200 to about 400, although the usual average is in the neighborhood of 300. However, the polyolefinic cyclic hydrocarbon fraction may comprise components having molecular weights as low as about 150 and as high as about 1,000. Although the hydrogen to carbon atomic ratios in the polyolefinic cyclic hydorcarbon fraction will vary somewhat, depending upon the particular source of the starting material, this ratio is from about 1.67 to about 1.72 while the actual weight per cent of hydrogen varies from about 12.35 to about 12.6%. In case of polyolefinic cyclic hydrocarbon fractions, recovered from an aluminum chloride catalyst phase, the hydrogen to carbon atomic ratios range from about 1.58 to about 1.72 with the actual percentage by weight of hydrogen averaging about 12.4.

The physical properties of the polyolefinic cyclic hydrocarbon fraction will vary somewhat depending upon whether the entire boiling range of material or a specific fraction thereof is employed. In general, the lower boiling fractions have similar properties regardless of the particular catalyst phase from which they are derived and are water-white or straw-yellow in color. Usually the higher boiling fractions are somewhat darker in color and differ more widely, those derived from hydrogen fluoride catalyst phases being substantially non-aromatic and partly bicyclic or dicyclic, while those derived from catalyst complexes formed in reactions involving such catalysts as aluminum chloride or sulfuric acid contain a certain amount of aromatic hydrocarbons.

The adduct of the polyolefinic cyclic hydrocarbon fraction and a dicarboxylic dienophilic acid ester of a beta,gamma-olefinic alcohol, such as diallyl maleate is conveniently prepared by heating a mixture of the polyolefinic cyclic hydrocarbon fraction with an equivalent amount of the diallyl maleate until the Diels-Alder addition reaction is completed. A dienophilic compound such as those referred to above, is an unsaturated compound containing the grouping C=C—R (where R may be a carbonyl group) and capable of undergoing a Diels-Alder addition with a conjugated dienic system as referred to by Norton, Chem. Rev. 31, 320–327 (1942).

The formation of the adduct of the polyolefinic cyclic hydrocarbon fraction with an ester of a dicarboxylic dienophilic acid and a beta,gamma-olefinic alcohol is carried out at a temperature preferably of about 110° C., although temperatures from about 25° C. to about 180° C. or even higher may be employed. In general, the higher the molecular weight of the polyolefinic cyclic hydrocarbon fraction, the higher the temperature required to effect reaction.

The diallyl maleate adduct may also be prepared by esterification of the maleic anhydride adduct of the polyolefinic cyclic hydrocarbon fraction with allyl alcohol. Such esterification is effected readily in the presence of an acid catalyst, such as sulfuric acid, but the side reactions which take place usually make the yields by this method less attractive than those obtained by the direct addition of diallyl maleate to the polyolefinic cyclic hydrocarbon fraction. Other adducts utilizable in this process may be prepared similarly by reacting a polyolefinic cyclic hydrocarbon fraction with an ester of a dicarboxylic dienophilic acid, such as fumaric, citraconic, mesaconic, and itaconic acid, and a beta,gamma-olefinic alcohol, including crotyl, methallyl, and cinnamyl alcohols.

The ethylenic compounds used in the preparation of the co-polymer resin of this process are unsymmetrical and contain at least one strongly electro-negative group attached to a carbon atom selected from the members of the group consisting of an ethylenic carbon atom and a carbon atom in alpha position to an ethylenic carbon atom.

The ethylenic compounds which contain a strongly electro-negative group attached to an ethylenic carbon atom may be represented by the general formula

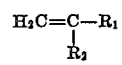

$$H_2C=C-R_1$$
$$\quad\; |$$
$$\quad\; R_2$$

wherein $R_1$ represents a member selected from the group consisting of hydrogen, chlorine, bromine, fluorine, and an alkyl group, and $R_2$ represents a member selected from the group consisting of an aryl group, chlorine, bromine, fluorine, an alkyl carboxy group, an alkyl substituted aryl group, and a halogen substituted aryl group, when $R_1$ is hydrogen; $R_2$ is an aryl group when $R_1$ is an alkyl group; and $R_2$ is a halogen group when $R_1$ is a halogen group. Such ethylenic compounds which contain strongly electronegative groups attached to ethylenic carbon atoms, that is, to one of the carbon atoms joined by a double bond and which are utilizable in this process include vinyl aromatics such as styrene; such substituted styrenes as α-methyl styrene, p-methyl-α-methyl styrene, p-chlorostyrene; indene and substituted indenes; vinyl naphthalenes; substituted vinyl naphthalenes; haloethylenes including vinyl fluoride, chloride, and bromide; and the vinylidene halides such as vinylidene fluoride, chloride, and bromide, as well as 1-fluoro-1-chloroethylene; vinyl esters such as vinyl acetate, etc. The reactivity of the vinyl compounds employed varies, depending upon the relative electronegativity of the substituted vinyl group. For example, p-methyl styrene and p-chlorostyrene undergo reaction more readily than does unsubstituted styrene.

Ethylenic compounds which contain strongly electronegative groups attached to a carbon atom which is in alpha position to one of the double bonded carbon atoms and utilizable in the process may be represented by the general formula

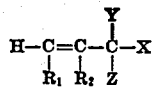

wherein $R_1$ and $R_2$ each represent a member selected from the group consisting of a hydrogen atom, and a hydrocarbon radical including an alkyl group, a cycloalkyl group, an aryl group, and an aryl alkyl group; X represents a member selected from the group consisting of a halogen atom, an aryl group, an alkenoxy group (as C=C—C—O), an alkylcarboxy group (as $CH_3$—COO—), an alkenylcarboxy group (as C=C—COO—), an O-alkylcarboxyalkylenecarboxy group (as $CH_3OOC$—$(CH_2)_2COO$—), an O - alkenylcarboxyalkylenecarboxy group (as C=C—COOC—$(CH_2)_2COO$—), an O-alkylcarboxyalkenylenecarboxy group (as $CH_3OOC$—$CH$=$CH$—COO—)

an O - alkenylcarboxyalkenylenecarboxy group (C=C—COOCH=CH—COO—), an O-alkylcarboxyarylenecarboxy group or an O-alkenylcarboxyarylenecarboxy group (as $CH_3$— or

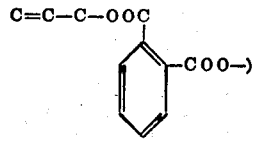

an amino group, an alkylthio group, an alkenylthio group, or an alkylcarboxyamido group (as $CH_3CONH$—), an alkenylcarboxyamido group (as

when Y and Z each represents a member selected from the group consisting of a hydrogen atom and an alkyl group; X represents a member selected from the group consisting of an alkoxy (as $CH_3O$—), alkyl, aryl, and alkenyl groups when Y and Z represent a bivalent oxygen atom; and X, Y and Z together may comprise a trivalent nitrogen atom. The ethylenic compounds which contain strongly electronegative groups attached to a carbon atom in alpha position to one of the carbon atoms of the ethylenic group, as indicated by the above general formula include acrylic esters such as the methyl acrylates; acrylonitrile; substituted acrylic esters such as methyl methacrylates; esters of beta,gamma-unsaturated alcohols with carboxylic acids, either saturated or unsaturated, such as diallyl maleate, diallyl fumarate, diallyl phthalate, diallyl succinate, etc.; amides of allyl amine; diallyl ether; allyl halides, such as, for example, allyl chloride; allylamine; vinyl alkyl ketones, vinyl aryl ketones, and vinyl alkenyl ketones; diallyl thioether; crotyl benzene; and other ethylenic compounds.

The reactivity of the ethylenic compounds employed varies, depending upon the relative electronegativity of the substituent group. The properties of the resulting co-polymer products also vary with the type of substituted ethylenic compound used.

The reaction of the adduct of an unsaturated ester of a dicarboxylic dienophilic acid with the polyolefinic cyclic hydrocarbon fraction and an ethylenic compound as herein set forth can be facilitated by heat, light, or the presence of a catalyst. Suitable polymerization catalysts include acids which are known to be effective in polymerization such as sulfuric acid, hydrogen fluoride, and phosphoric acid; Friedel-Crafts metal halides, as for example, aluminum chloride, zinc chloride, ferric chloride, etc., and peroxide catalysts such as benzoyl peroxide or other oil-soluble peroxides.

The temperatures selected for the co-polymerization reaction depend upon the amount and kind of catalyst used, upon the particular type of ethylenic compound employed and upon the resinous product it is desired to make; in some cases (for example, when the product is to be used for laminating purposes or for the preparation of baking varnishes), it may be desirable to stop the reaction short of the finished state in order that a readily soluble semi-fluid product may be obtained. Temperatures from about 25° C. up to about 300° C. are suitable, with reaction times ranging from several hours to several weeks, depending upon the temperature and the particular reactants involved. In general, the molecular weight of the product is dependent upon the temperature of polymerization and the amount of catalyst, the highest molecular weight products being obtained with relatively small concentrations of catalyst and at relatively low temperatures with long polymerization times.

The lower boiling fractions of the polyolefinic cyclic hydrocarbon fraction obtained from the catalyst layer in the conjunct polymerization reaction undergo adduct formation with a dicarboxylic dienophilic acid ester of a beta,gamma-olefinic alcohol much more readily than do the higher boiling fractions and in addition are of light color and accordingly are preferred for use in the preparation of the adduct. From about 5 to about 95% by weight of the adduct can be combined with from about 95 to about 5% by weight of the ethylenic compound but in many cases only limited amounts of ethylenic compound may be included if the product is to be a hard, homogeneous solid material.

The resulting resinous products may be used for various purposes depending upon their characteristic properties. Such resinous products are useful in the preparation of decorative and protective coatings, as plastics, molding powders, laminates, adhesives, extenders of other resins and the like.

The following examples are introduced to illustrate the products of this invention and the methods for preparing them, although these data are not to be misconstrued to limit unduly the generally broad scope of the invention.

*Example I*

A polymer gasoline was reacted with hydrogen fluoride at a temperature of 78° C., pressure of 10.7 atmospheres, and a gasoline:hydrogen fluoride (liquid) volumetric ratio of 4.23:1. After completion of the reaction the products were separated into a hydrocarbon layer and a catalyst phase and the latter hydrolyzed with water to yield a polyolefinic cyclic hydrocarbon fraction.

The latter was then fractionated and a fraction boiling between 200° and 275° C. was used in the preparation of a resin.

To prepare the adduct of the polyolefinic cyclic hydrocarbon fraction and diallyl maleate, 24 parts by weight of said fraction boiling from 200° to 275° C. was combined with 19.75 parts by weight of diallyl maleate and heated on a water bath in an atmosphere of carbon dioxide. The reaction was started at a temperature of 80–95° C. and completed at a temperature of 180° C. The product was vacuum distilled to remove unreacted material and the diallyl ester adduct recovered was found to be a viscous light yellow fluid having the following properties:

| | |
|---|---|
| $d_4^{20}$ | 1.007 |
| $n_D^{20}$ | 1.4908 |
| Specific dispersion | 105 |
| Molecular weight | 437 |
| Per cent by weight of carbon | 74.91 |
| Per cent by weight of hydrogen | 9.09 |

The diallyl ester adduct itself, when heated at a temperature of 225° C. for 24 hours, solidified to a hard clear light yellow thermosetting solid which was quite adherent to glass and had a brilliant quality. It was only slightly soluble in petroleum naphtha, toluene, ethyl acetate, butyl acetate, and acetone.

Example II

A diallyl maleate adduct was prepared from a polyolefinic cyclic hydrocarbon fraction as indicated in Example I. This fraction had the following properties:

| | |
|---|---|
| Boiling range °C | 275–320 |
| Density ($d_4^{20}$) | 0.856 |
| Index of refraction ($n_D^{20}$) | 1.4829 |
| Specific dispersion | 139 |
| Molecular weight | 257 |
| Bromine number (UOP)[1] | 202 |
| Diene value | 78.5 |
| Number of double bonds/mol. (from bromine number) | 3.36 |
| Number of conjugated double bonds/mol. | 1.65 |
| Per cent by weight of carbon | 87.74 |
| Per cent by weight of hydrogen | 12.35 |

[1] As determined by UOP Method No. H-4 described in "UOP Laboratory Test Methods for Petroleum and Its Products," 1937, pp. 186-7; and in Method H-44-40 given in pp. H-25 and H-26 of 1940 edition of same publication.

Mixtures were prepared to contain 10, 30, 50, 70, and 90 weight per cent of the polyolefinic cyclic hydrocarbon fraction-diallyl maleate adduct commingled with the following unsaturated materials: diallyl maleate, acrylonitrile, methyl acrylate, diallyl phthalate and diallyl succinate. The mixtures were subjected to gradually increasing temperatures, namely 25° C., 50° C., 80° C., 110° C., 140° C., 180° C., and 220° C. The resultant products varied from soft, semi-solid materials to hard, solid resins and from opaque to clear, depending upon the reactants and the proportions in which they were used.

The conditions of the polymerization treatment, the products obtained and some of their properties are indicated in the following table:

| Co-polymerizing Unsaturates | Amount of Diallyl Adduct Compatible, per cent by Wt. of mixture | Minimum Temperature of Polymerization, °C. | Time of Polymerization, hours | Description of Co-Polymers |
|---|---|---|---|---|
| Diallyl maleate | All proportions | 180 | 24 | Hard, clear, thermosetting. |
| Acrylonitrile | do | 50 | 48 | Hard, opaque. |
| Methyl acrylate | Less than 70 | 80 | 48 | Soft, transparent solid. |
| Diallyl phthalate | All proportions | 140 | 168 | Soft, transparent solid with up to 70% adduct; hard, transparent with 90%. |
| Diallyl succinate | do | 180 | 240 | Jelly-like with less than 50% adduct, soft with 50-70%, hard with over 70%—all transparent. |

The above table indicates the amounts of diallyl maleate adduct of the polyolefinic cyclic hydrocarbon fraction that are compatible with the other unsaturated materials. That is, the table shows the amounts of diallyl maleate, acrylonitrile, methyl acrylate, diallyl phthalate and diallyl succinate, that may be incorporated with the diallyl maleate adduct of the polyolefinic cyclic hydrocarbon fraction to give a homogeneous product.

Example III

Mixtures of the polyolefinic cyclic hydrocarbon-diallyl maleate adduct prepared in Example II and vinyl acetate, styrene, α-methyl styrene, and indene were reacted in the presence of 0.5 weight percent of benzoyl peroxide at gradually increasing temperatures, namely 25° C., 50° C., 80° C., 110° C., 140° C., 180° C., and 220° C. The resinous products varied from soft semi-solid materials to hard, solid resins, depending upon the reactants and the proportions in which they were used. The products obtained are described in the following table:

| Copolymerizing Unsaturate | Amount of Diallyl Maleate Adduct of Polyolefinic Cyclic hydrocarbon Compatible, Per Cent by weight of the mixture | Minimum Temperature of Polymerization, °C. | Time of Polymerization, hours | Description of Co-polymers |
|---|---|---|---|---|
| Vinyl acetate | 10 and higher | 200 | 96 | Clear, soft to rubbery. |
| Styrene | All proportions | 50 | 168 | Hard, clear, thermoplastic. |
| α-Methyl-styrene | 30 and Higher | 180 | 72 | Hard, clear, for <30% α-methylstyrene. Soft for more than 50% α-methylstyrene. |
| Indene | All proportions | 180 | 192 | Hard, clear, thermoplastic. |

The above table indicates the amount of diallyl maleate adduct of the polyolefinic cyclic hydrocarbon fraction that is compatible with vinyl acetate, styrene, α-methylstyrene and indene. The term compatible is used in referring to the fact that the adduct is capable of being incorporated homogeneously with the other unsaturated material to give a uniform product and not a product consisting of two phases.

I claim as my invention:

1. A resinous material comprising the copolymerization product of (1) from about 5 to about 95% by weight of an ethylenic compound selected from the group consisting of vinyl aromatics, indenes, monohalo-ethylenes, vinylidene halides, vinyl esters, acrylic and substituted acrylic esters, acryonitrile, esters of beta,gamma-unsaturated alcohols with carboxylic acids, amides of allyl amine, diallyl ether, allyl halides, allylamine, diallyl thioether and crotyl benzene with (2) from about 95 to 5% by weight of the adduct of an ester as hereinafter defined and a mixture of polyolefinic cyclic hydrocarbons boiling in the range of from about 150° to about 450° C. and containing an average of from about 2.5 to about 4 double bonds per molecule, of which from about 40 to about 70% are conjugated, said polyolefinic cyclic hydrocarbon mixture having a bromine number of above about 140, a density of from about 0.83 to about 0.93, an acid number below 3, and a maleic anhydride value of from about 30 to about 90, said ester being an ester of a beta,gamma-olefinic monohydric alcohol and a dicarboxylic acid selected from the group consisting of maleic, fumaric, citraconic, mesaconic and itaconic acids.

2. The resinous material of claim 1 further characterized in that said polyolefinic cyclic hydrocarbon mixture has a boiling range of from about 200° to about 275° C.

3. The resinous material of claim 1 further characterized in that an electronegative group of said ethylenic compound is attached to an ethylenic carbon atom.

4. The resinous material of claim 1 further characterized in that an electronegative group of said ethylenic compound is attached to a carbon atom in alpha position to an ethylenic carbon atom.

5. The resinous material of claim 1 further characterized in that said ethylenic compound is a vinyl aromatic.

6. The resinous material of claim 1 further characterized in that said ethylenic compound is styrene.

7. The resinous material of claim 1 further characterized in that said ethylenic compound is styrene and said ester is diallyl maleate.

8. The resinous material of claim 1 further characterized in that said ester is diallyl maleate.

9. The resinous material of claim 1 further characterized in that said ethylenic compound is a vinyl aromatic and said ester is diallyl maleate.

HERMAN S. BLOCH.

REFERENCES CITED

The following references are of record in the file of this patent:

UNITED STATES PATENTS

| Number | Name | Date |
|---|---|---|
| 2,359,038 | Hopff et al. | Sept. 26, 1944 |
| 2,445,627 | Morris et al. | July 20, 1948 |

OTHER REFERENCES

Ipatieff et al., article in Jour. Am. Chem. Soc., vol. 58, pages 915–917, June 1936.